United States Patent [19]

Boenecke

[11] 4,087,659
[45] May 2, 1978

[54] TAMPERPROOF HANDSET FOR RAILROAD APPLICATIONS

[76] Inventor: Charles A. Boenecke, 1 Capshire Dr., Cherry Hill, N.J. 08003

[21] Appl. No.: 760,877

[22] Filed: Jan. 21, 1977

[51] Int. Cl.² ............................................. H04R 1/06
[52] U.S. Cl. ................................ 179/186; 174/65 R; 179/103; 179/178
[58] Field of Search ............... 179/186, 184, 187, 178, 179/179, 103; 339/94 A, 129, 130; 174/65 R, 65 SS

[56] References Cited

U.S. PATENT DOCUMENTS

| 2,226,733 | 12/1940 | McLarn | 179/186 |
| 3,377,442 | 4/1968 | Foster, Jr. | 179/186 |

FOREIGN PATENT DOCUMENTS

| 87,494 | 6/1885 | Germany | 179/167 |
| 279,808 | 11/1930 | Italy | 179/187 |
| 974,487 | 11/1964 | United Kingdom | 179/103 |
| 333,861 | 8/1930 | United Kingdom | 179/103 |

Primary Examiner—Thomas W. Brown
Attorney, Agent, or Firm—Seidel, Gonda & Goldhammer

[57] ABSTRACT

A tamperproof handset for use in railroad communication systems has a cable which interconnects it with a communications control panel. The transmitter end of the handset and a cap therefor have mating threads. A screw passes through a hole in the transmitter cap and tightens down onto the threaded peripheral surface of the transmitter end to prevent removal of the cap. A bushing having a flange and a threaded portion is received within a hole in the panel of the communication control. A nut screws onto the threaded portion of the bushing and secures the bushing to the panel. The cable passes through a hole in the bushing and is wired to appropriate terminals within the control.

8 Claims, 3 Drawing Figures

U.S. Patent    May 2, 1978    Sheet 1 of 2    4,087,659
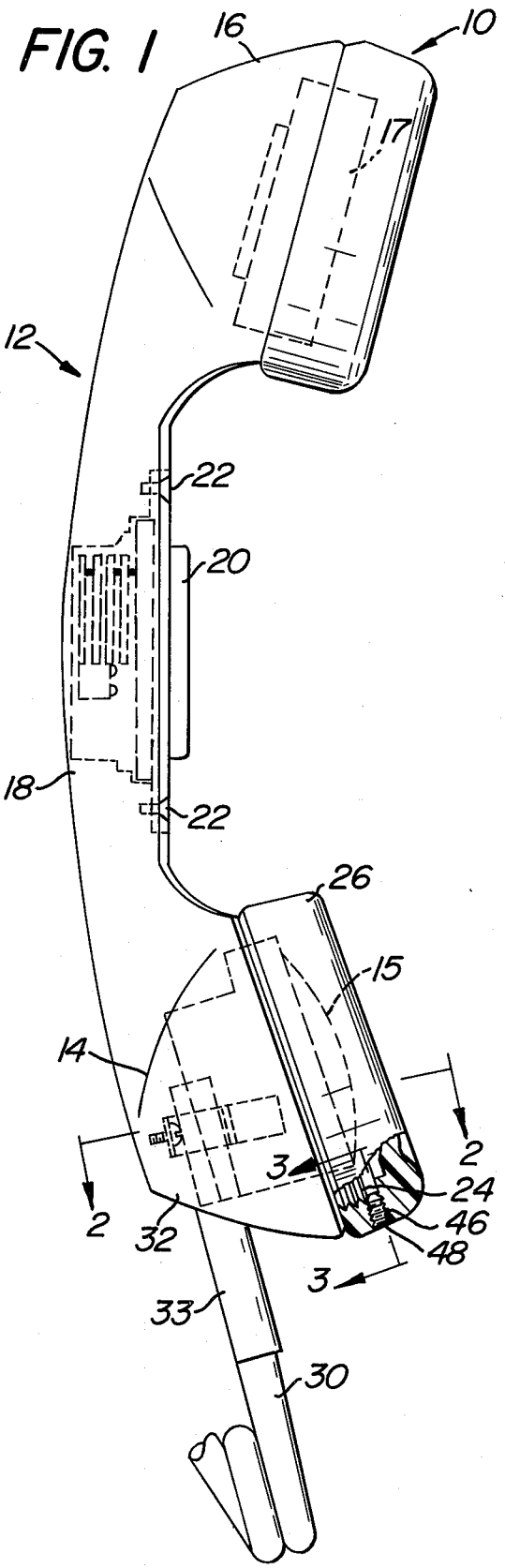
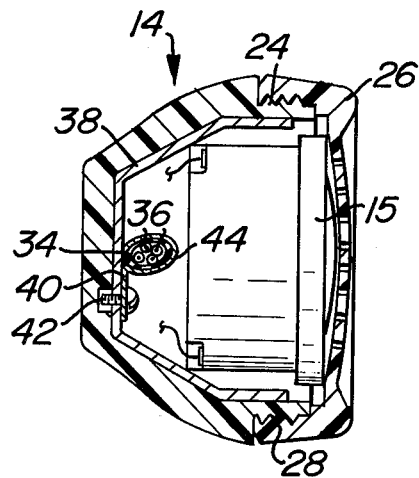
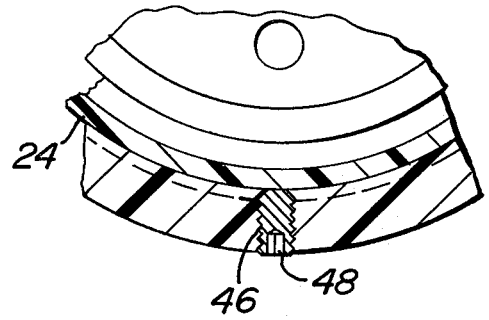

TAMPERPROOF HANDSET FOR RAILROAD APPLICATIONS

BACKGROUND OF THE INVENTION

Communications handsets can be used with transceivers, public address systems or other communication devices located on rail road locomotives, at railroad terminals and other railway communication centers.

Handsets which have been used in railroad communication systems have utilized removable connectors to interconnect the handset to a communication control panel for a transceiver or other communication device. An example of the prior art connector is illustrated in FIG. 4 herein and will be discussed more fully hereinafter. A problem with the use of a removable interconnector is that it is too readily removable. In recent years, railroads have sustained great losses due to the theft of communication handsets. A thief merely requires a few seconds to unscrew the connector, unplug the cable from the control panel and carry away the handset.

SUMMARY OF THE INVENTION

The tamperproof handset of the present invention includes a communications handset having a transmitter end and a receiver end. A cable having a plurality of wires is adapted to connect the handset to a communication control panel. The cable passes through a hole in the handset in the area of the transmitter end and is secured therein. The transmitter end has a threaded peripheral surface and a transmitter cap, having a threaded interior, screws onto the peripheral surface. A bushing having a flange and a threaded portion is adapted to pass through a hole in a panel of a communication control. The flange is adapted to rest on the outer surface of the panel. A nut screws onto the bushing and is adapted to screw down onto the inner surface of the panel. A cable passes through a hole in the bushing and is adapted to extend into the communication control.

In the preferred embodiment, a sleeve surrounds the cable and extends into and on either side of the bushing. A clamp is secured around the sleeve adjacent the nut and prevents the cable from being pulled out of the bushing. With the bushing secured to the panel by the nut and with the clamp secured to the cable, the cable cannot be readily removed from the communication control unless access is gained to the interior of the control and the clamp is removed.

A U-shaped bracket is secured to the interior of the transmitter end and a clamp is removably secured to the bracket. The clamp is attached to the cable in order to prevent the cable from being pulled out of the handset unless the clamp is removed. A threaded hole extends through the transmitter cap and a screw threads into the hole. The screw tightens down on the threaded surface of the transmitter end and, hence, prevents the transmitter cap from being unscrewed. An Allen screw is preferably used and threads completely into the hole. Thus, a person desiring to unscrew the transmitter cap and remove the clamp holding the cable to the handset would require a suitable Allen wrench to remove the screw. An additional deterrent to the theft of the handset is thus presented.

It is an object of the invention to provide a tamperproof handset so as to prevent the ready removal of a handset from a cable.

It is another object of the invention to prevent the ready removal of a cable, which interconnects a transceiver with a handset, from the transceiver.

Other objects will appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a side view, partially broken away, of a handset of the present invention.

FIG. 2 is a cross-sectional view taken along line 2—2 of FIG. 1.

FIG. 3 is a cross-sectional view taken along line 3—3 of FIG. 1.

DETAILED DESCRIPTION OF THE INVENTION

Figure 4:
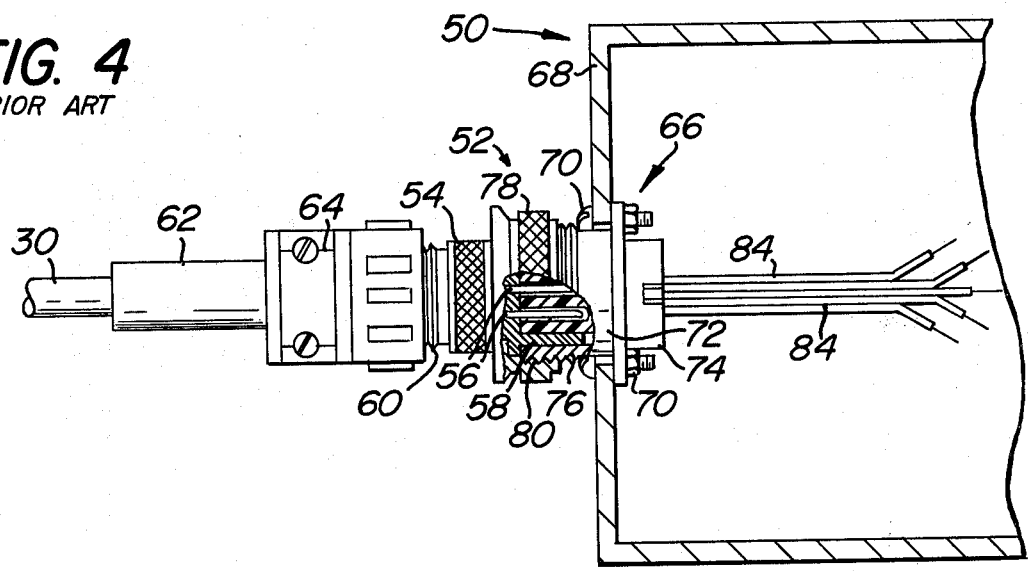
FIG. 4 is a side view, partially broken away, illustrating a connector of the prior art connecting a cable to the panel of a communication control.

Referring to the drawings in detail, wherein like numerals indicate like elements, there is shown in FIG. 1 an apparatus in accordance with the present invention designated generally as 10. The apparatus includes a communication handset 12. The communication handset 12 has a transmitter end 14 with a transmitter 15 disposed within it and a receiver end 16 with a receiver 17 disposed within it. A handle portion 18 interconnects the transmitter end 14 with the receiver end 16. A control switch or button 20 is removably attached to the handle portion 18 by a pair of screws 22.

The outer periphery of the transmitter end 14 has a threaded portion 24. A transmitter cap 26 has an internal threaded surface 28. The internal threaded surface 28 is adapted to screw onto the threaded portion 24 of the transmitter end 14. A cable 30 passes through a hole 32 in the transmitter end 14. The cable 30 has an outer covering 34 surrounding a plurality of wires 36 disposed within the cable 30. The cable 30 extends into the interior of the handset 12 by way of the hole 32. A sleeve 33 preferably surrounds the cable 30 in the area where the cable 30 enters the transmitter end 14. A generally U-shaped bracket 38 is fitted within the interior of the transmitter end 14. It is preferable that the U-shaped bracket 38 fit substantially flush with the interior surface of the transmitter end 14. A clamp 40 is removably secured to the bracket 38 by a screw 42. The clamp 40 includes a curved section 44 which is adpated to fit about the covering 34 of the cable 30. The curved section 44 is crimped about the cable 30 and thereby squeezes upon and frictionally holds the cable 30. The cable 30, therefore, cannot be readily pulled out of the handset 12 without first removing the clamp 40.

In order to remove the clamp 40, a person must first gain access to the interior of the transmitter end 14 by removing the transmitter cap 26 and the transmitter 15. The transmitter cap 26 has a threaded hole 46 extending completely therethrough. A threaded screw 48 threads into the hole 46. In order to prevent the unauthorized removal of the transmitter cap 26, the screw 48 is threaded into the hole 46 until it firmly bears upon the threaded surface 24. The transmitter cap 26 thereby cannot be rotated and unscrewed, unless the screw 48 is loosened. The screw 48 is preferably an Allen screw. Also, the screw 48 has a length such that the screw 48 is flush with or below the outer periphery of the transmitter cap 26 whenever the screw 48 has been tightened down onto the threaded portion 24. In this manner, the unauthorized removal of the clamp 40 is greatly hampered since an Allen wrench is required to remove the screw 48 before the transmitter cap 26 can be removed.

In FIG. 1, one end of the cable 30 is shown connected to a handset 12. The other end of the cable 30 is connected to a communication control 50. The communication control 50 may be connected to a transceiver or other communicational device. The cable 30 is shown connected to a control 50 by way of a standard removable connector 52, as shown in FIG. 4. The removable connector 52 is a standard prior art connector. The removable connector 52 includes an inner cylindrical member 54, which has a plurality of male prongs 56 extending from one end thereof. The male prongs 56 are surrounded by a cylindrical flange 58. The inner cylindrical member 54 also includes a section having a threaded periphery 60. The cable 30 is received within the inner cylindrical member 54, and the wires 36 are connected to the prongs 56 in a conventional manner. A sleeve 62 is received about the cable 30 and extends at least partially into the inner cylindrical member 54. A clamp 64 is secured about the sleeve 62 and threads onto the threaded periphery 60 in order to secure the cable 30 relative to the connector 52.

A female connector 76 is removably connected to a front panel 68 of the control 50 by means of a plurality of nuts and bolts 70. The female connector 66 includes an outer section 72 extending outwardly from the front panel 68 and an inner section 74 extending within the control 50. The outer section 72 includes a section having a threaded peripheral surface 76. The removable connector 52 includes an annular ring 78. The annular ring 78 has an inner threaded portion 80. The inner threaded portion 80 screws onto the threaded peripheral surface 76. The outer section 72 includes a plurality of female receptacles 82 for receiving the prongs 56. The female receptacles 82 are electrically connected to wires 84. The wires 84 are wired in a conventional manner to appropriate connections within the control 50.

In order to connect a handset 12 to a control 50 by means of the connector 52, the cylindrical flange 58 of the inner cylindrical member 54 is slid into the outer section 72 of the female connector 66. The male prongs 56 thus mate with female receptacles 82 to provide an electrical connection between the handset 12 and the control 50. The cable 30 is fixedly but removably secured to the control 50 by tightening down the annular ring 78 onto the outer section 72 of the female connector 66. While the connector 52 provides a simple and easy method for connecting a handset 12 to a control 50, the use of such a connector 52 also facilitates the easy removal and theft of a handset 12.

Figure 5:
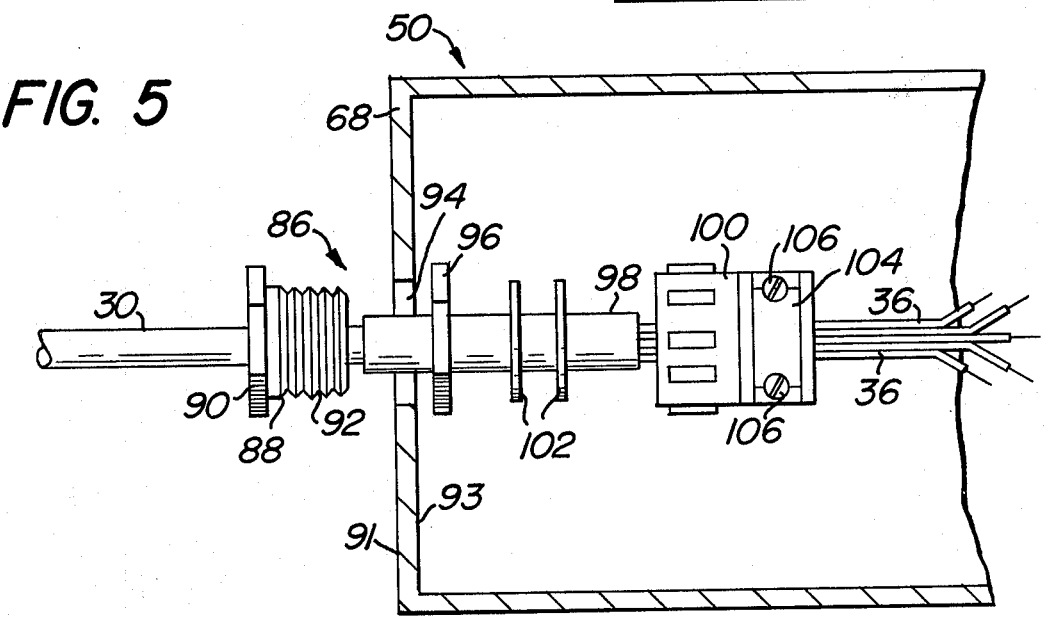
FIG. 5 is a side view of the connector of the present invention, shown with its parts exploded.
Figure 6:
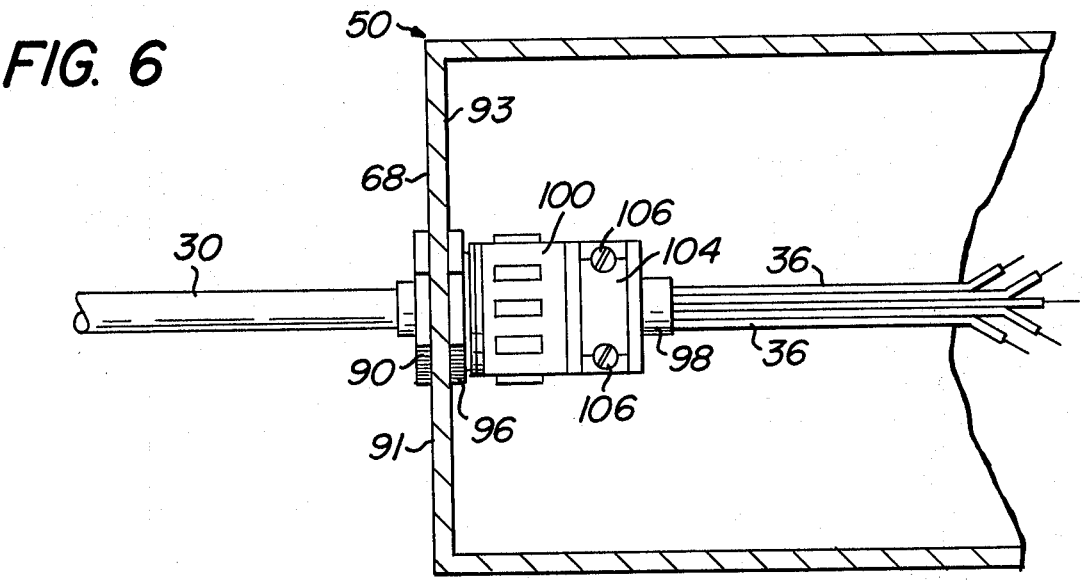
FIG. 6 is a side view of the connector of the present invention secured to the panel of a communication control.

In order to prevent or discourage the removal and theft of the handsets 12, the present invention utilizes a fixed connector 86 as shown in FIGS. 5 and 6. The fixed connector 86 includes a bushing 88. The bushing 88 has a flange 90 and a threaded section 92. The threaded section 92 passes through a hole 94 within the front panel 68 of a control 50 and extends into the interior thereof. The flange 90 rests upon the outer surface 91 of the panel 68, and a nut 96 threads onto the threaded section 92 and tightens down upon the inner surface 93 of the panel 68. The bushing 88 is thus secured to the control 50.

The cable 30 passes through a hole within the bushing 88 and extends into the interior of the control 50. A sleeve 98 preferably surrounds the cable 30 in the area where the cable 30 passes through the bushing 88 and in the area extending on either side of the bushing 88. A clamp 100 having an internally threaded surface (not shown) screws onto the threaded section 92 of the bushing 88 and is thereby secured thereto. Anti-friction devices such as washers 102 are preferably interposed between the clamp 100 and the nut 96. The clamp 100 includes a clamp-down section 104, which is tightened down upon the sleeve 98 and the cable 30 by a pair of screws 106. The clamp 100 has a greater transverse dimension than the hole 94. In this manner, the clamp 100 in combination with the bushing 88 fixedly secures the cable 30 to the control 50. The wires 36 are wired in a conventional manner to appropriate terminals within the control 50. In this manner, the easy removal and theft of a handset 12 is discouraged since the cable 30 cannot be readily removed without first gaining access to the interior of the control.

As should be clear from the above discussion, a tamper-proof handset system is thus provided. At the handset end of the system, the use of the set screw 48 in conjunction with the clamp 40 prevents the easy removal and theft of a handset 12. At the control end of the system, the bushing 88 in conjunction with the clamp 100 and the wiring of the wires 36 to the control 50 prevent the easy removal of the handset 12 and the cable 30.

The present invention may be embodied in other specific forms without departing from the spirit or essential attributes thereof and, accordingly, reference should be made to the appended claims, rather than to the foregoing specification as indicating the scope of the invention.

I claim:

1. A tamperproof handset for use in a system such as a railroad communication system comprising:
   a communication handset;
   said handset including a transmitter end;
   a housing discrete from said handset;
   a cable having a plurality of wires;
   said cable having one end passing through a hole in said handset in the area of said transmitter end, said cable extending into said handset;
   means for securing said cable within said handset;
   said transmitter end having threaded outer peripheral surface;
   a transmitter cap removably connected to said outer peripheral surface;
   means removably locking said transmitter cap to said end;
   a bushing having a flange and threaded portion;
   said flange resting on the outer surface of said housing and said threaded portion extending into said housing;
   a nut for screwing onto the threaded portion of said bushing and for securing the bushing to the housing;
   the other end of said cable passing through a hole in said bushing and extending into the interior of said housing;

clamping means secured to said cable within said housing for preventing the motion of said cable relative to said clamp means; and said clamping means having an internal threaded surface for screwing onto the threaded portion of said bushing whereby said clamping means is secured within said housing.

2. A tamperproof handset in accordance with claim 1 including a sleeve surrounding said cable and extending into and on either side of said bushing and said clamp being secured around said sleeve adjacent said nut for preventing the cable from being pulled out of said housing.

3. A tamperproof handset in accordance with claim 1 wherein said means for securing the cable within the handset includes a generally U-shaped bracket secured to the interior of said transmitter end and a clamp removably secured to said U-shaped bracket and attached to said cable.

4. A tamperproof handset in accordance with claim 3 wherein said means for removably locking the transmitter cap to said transmitter end includes a threaded hole passing through said transmitter cap and a screw threading into said threaded hole in the transmitter cap and adapted to tighten down onto said outer peripheral surface to prevent the removal of said transmitter cap from said transmitter end.

5. A tamperproof handset system for use in a railroad communications control panel comprising:

a panel wall; a handset having a transmitter end and a receiver end;

a cable having a plurality of wires disposed therein and interconnecting said control with said handset;

said cable extending into said handset in the area of said transmitter end;

means for securing said cable within said handset;

said transmitter end having a transmitter cap which threads onto said transmitter end;

a bushing having a flange and a threaded portion;

said threaded portion of the bushing passing through a hole in said panel and extending past the interior surface of said panel wall;

a nut threading onto the threaded portion of said bushing and tightening onto the interior surface of said panel wall to secure the bushing to the panel wall;

said bushing having a hole through which said cable passes and extends past the interior surface of said panel wall;

said wires being adapted to be wired to terminals within a control panel; and clamp means having a threaded interior surface at one of its ends for screwing onto the threaded portion of said bushing and a clamp-down section at its outer end for securing said cable relative to said clamp means.

6. A tamperproof handset system in accordance with claim 5 including a sleeve surrounding said cable and extending into and on either side of said bushing, and said clamp being secured around said sleeve on the interior side of said panel wall for preventing the cable from being pulled out of said panel wall.

7. A tamperproof handset system in accordance with claim 5 wherein said means for securing the cable within the handset includes a generally U-shaped bracket disposed within the interior of said transmitter end and a clamp removably secured to said U-shaped bracket and attached to said cable.

8. A tamperproof handset system in accordance with claim 7 including a threaded hole passing through said transmitter cap and a screw threading into said hole in the transmitter cap and adapted to tighten down onto a surface of said transmitter end to prevent the removal of said transmitter cap from said transmitter end.

* * * * *